(12) United States Patent
Lee et al.

(10) Patent No.: US 12,373,238 B2
(45) Date of Patent: Jul. 29, 2025

(54) SYSTEMS AND METHODS FOR SOLID STATE DEVICE (SSD) SIMULATION

(71) Applicant: Samsung Electronics Co., Ltd., Gyeonggi-do (KR)

(72) Inventors: Hobin Lee, San Jose, CA (US); Rekha Pitchumani, Herndon, VA (US)

(73) Assignee: Samsung Electronics Co., Ltd (KR)

(*) Notice: Subject to any disclaimer, the term of this patent is extended or adjusted under 35 U.S.C. 154(b) by 581 days.

(21) Appl. No.: 17/864,071

(22) Filed: Jul. 13, 2022

(65) Prior Publication Data
US 2023/0376338 A1    Nov. 23, 2023

Related U.S. Application Data

(60) Provisional application No. 63/342,850, filed on May 17, 2022.

(51) Int. Cl.
| | | |
|---|---|---|
| *G06F 9/455* | (2018.01) | |
| *G06F 9/54* | (2006.01) | |
| *G06F 12/0873* | (2016.01) | |
| *G06F 12/0891* | (2016.01) | |

(52) U.S. Cl.
CPC .......... *G06F 9/45558* (2013.01); *G06F 9/544* (2013.01); *G06F 12/0873* (2013.01); *G06F 12/0891* (2013.01); *G06F 2009/45583* (2013.01)

(58) Field of Classification Search
CPC .... G06F 3/0662; G06F 9/455; G06F 9/45504; G06F 9/45545; G06F 9/4555; G06F 9/45554; G06F 9/45558; G06F 9/5061; G06F 9/5077
See application file for complete search history.

(56) References Cited

U.S. PATENT DOCUMENTS

| | | |
|---|---|---|
| 7,239,611 B2 | 7/2007 | Khisti et al. |
| 7,472,052 B2 | 12/2008 | Foreman et al. |
| 7,496,492 B2 | 2/2009 | Dai |

(Continued)

FOREIGN PATENT DOCUMENTS

| | | |
|---|---|---|
| CN | 109101456 | 12/2018 |
| CN | 110888592 | 3/2020 |

(Continued)

OTHER PUBLICATIONS

Jinsoo Yoo et al., "VSSIM: Virtual Machine Based SSD Simulator", Mass Storage Systems and Technologies (MSST), IEEE 29th Symposium on, May 2, 2013, 14 pages.

(Continued)

*Primary Examiner* — Andy Ho
(74) *Attorney, Agent, or Firm* — The Farrell Law Firm, P.C.

(57) ABSTRACT

A system, methods, and devices for solid state device (SSD) simulation are provided. An application is executed at a virtual machine. Buffer pointers for application data of the executed application are sent from the virtual machine to a shared memory. The application data is copied from the virtual machine to data buffer pages of the shared memory. The buffer pointers are sent from the shared memory to an SSD simulator. The buffer pointers and corresponding references to the application data at the shared memory are stored in pages of a cache of the SSD simulator.

20 Claims, 10 Drawing Sheets

(56) References Cited

U.S. PATENT DOCUMENTS

| | | |
|---|---|---|
| 7,552,044 B2 | 6/2009 | Xu et al. |
| 8,032,352 B2 | 10/2011 | Bitar et al. |
| 8,355,407 B2 | 1/2013 | Wookey et al. |
| 9,164,689 B2 | 10/2015 | O'Brien et al. |
| 10,152,339 B1 | 12/2018 | Dong et al. |
| 10,379,983 B2 | 8/2019 | Cho et al. |
| 2003/0093258 A1* | 5/2003 | Fishstein .............. G06F 9/45504 703/21 |
| 2006/0217950 A1 | 9/2006 | Heybruck et al. |
| 2006/0217951 A1 | 9/2006 | Heybruck et al. |
| 2018/0275871 A1 | 9/2018 | Ptak |
| 2019/0310794 A1 | 10/2019 | Eom et al. |
| 2020/0381071 A1 | 12/2020 | Organ et al. |

FOREIGN PATENT DOCUMENTS

| | | |
|---|---|---|
| CN | 111752772 | 10/2020 |
| CN | 112395146 | 2/2021 |
| CN | 113407533 | 9/2021 |
| CN | 114397999 | 4/2022 |
| EP | 1 728 164 | 11/2012 |
| GB | 2 423 166 | 11/2007 |
| WO | WO 2014/070342 | 5/2014 |

OTHER PUBLICATIONS

Kyusik Kim et al., "HMB-SSD: Framework for Efficient Exploiting of the Host Memory Buffer in the NVMe SSD", IEEE Access, vol. 7, May 2, 2013, 9 pages.

European Search Report dated Oct. 11, 2023 issued in counterpart application No. 23164750.4-1224, 11 pages.

* cited by examiner

| | | | | |
|---|---|---|---|---|
| 0,0,0,0 | Data0 | | 0,0,0,0 | LPA0 |
| 0,0,0,1 | Data1 | | 0,0,0,1 | LPA1 |
| ..... | | | ..... | |
| 0,0,0,2047 | Data2047 | | 0,0,0,2047 | LPA2047 |
| 0,0,1,0 | Data2048 | | 0,0,1,0 | LPA2048 |
| 0,0,1,1 | Data2049 | | 0,0,1,1 | LPA2049 |
| ..... | | | ..... | |

702
Chip data file

704
Chip metadata file

SYSTEMS AND METHODS FOR SOLID STATE DEVICE (SSD) SIMULATION

PRIORITY

This application is based on and claims priority under 35 U.S.C. § 119(e) to U.S. Provisional Patent Application Ser. No. 63/342,850, filed on May 17, 2022, the entire contents of which are incorporated herein by reference.

TECHNICAL AREA

The present disclosure relates generally to solid state device (SSD) simulation, and more particularly, to a simulation method having component-level data storage and retrieval.

BACKGROUND

Big data applications handle extremely large datasets. SSDs are widely used as a hardware feature in cloud infrastructure for big data services. SSDs are well suited for big data applications because they provide fast storage performance, and are efficient and cost-effective. Specifically, input/output (I/O) intensive operations are accelerated by using an SSD architecture.

SUMMARY

Embodiments provide fine-grained behavior models of data I/O paths and retention at a component level in a simulator, enable real world applications to run in a simulation closer to real SSDs, and also allow SSD internal data functions, such as, for example, a flash redundant array of independent disks (RAID), to be simulated with data splitting (striping, mirroring, etc.) and data integrity coding methods (checksum, cyclic redundancy check (CRC), error checking and correcting (ECC), etc.) validation for real user data.

According to an embodiment, a method for SSD simulation is provided. An application may be executed at a virtual machine. Buffer pointers for application data of the executed application may be sent from the virtual machine to a shared memory. The application data may be copied from the virtual machine to data buffer pages of the shared memory. The buffer pointers may be sent from the shared memory to an SSD simulator. The buffer pointers and corresponding references to the application data at the shared memory may be stored in slots of a cache and a flash memory of the SSD simulator.

According to an embodiment, a method of SSD simulation at a shared memory is provided. Buffer pointers for application data of an application executed on a virtual machine may be received from the virtual machine. The application data may be copied from the virtual machine. The application data may be stored to data buffer pages of the shared memory. The buffer pointers may be sent to an SSD simulator. The SSD simulator references the application data stored at the shared memory using the buffer pointers.

According to an embodiment, a method of SSD simulation at an SSD simulator is provided. Buffer pointers for application data of an application executed on a virtual machine may be received from a shared memory. The buffer pointers and corresponding references to the application data stored at the shared memory may be stored in slots of a cache and a flash memory of the SSD simulator.

According to an embodiment, a system for SSD simulation is provided. The system includes a virtual machine configured to execute an application, send buffer pointers for application data of the executed application to shared memory, and copy the application data to data buffer pages of the shared memory. The system also includes the shared memory configured to store the copied application data to the data buffer pages, and send the buffer pointers to an SSD simulator. The system further includes the SSD simulator configured to store the buffer pointers and corresponding references to the application data stored at the shared memory, in slots of a cache and a flash memory of the SSD simulator.

According to an embodiment, a memory device is provided that includes data buffer pages and a controller. The controller may be configured to receive, from a virtual machine, buffer pointers for application data of an application executed on the virtual machine. The controller may also be configured to copy the application data from the virtual machine, store the application data to the data buffer pages, and send the buffer pointers to an SSD simulator. The SSD simulator references the application data stored at the shared memory using the buffer pointers.

According to an embodiment, an SSD simulator is provided that includes a cache and a controller. The controller may be configured to receive, from a shared memory, buffer pointers for application data of an application executed on a virtual machine. The controller may also be configured to store, in slots of the cache and a flash memory of the SSI) simulator, the buffer pointers and corresponding references to the application data stored at the shared memory.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7 is a diagram illustrating flash memory chip files of a flash memory of an SSD simulator, according to an embodiment;

DETAILED DESCRIPTION

Figure 1:
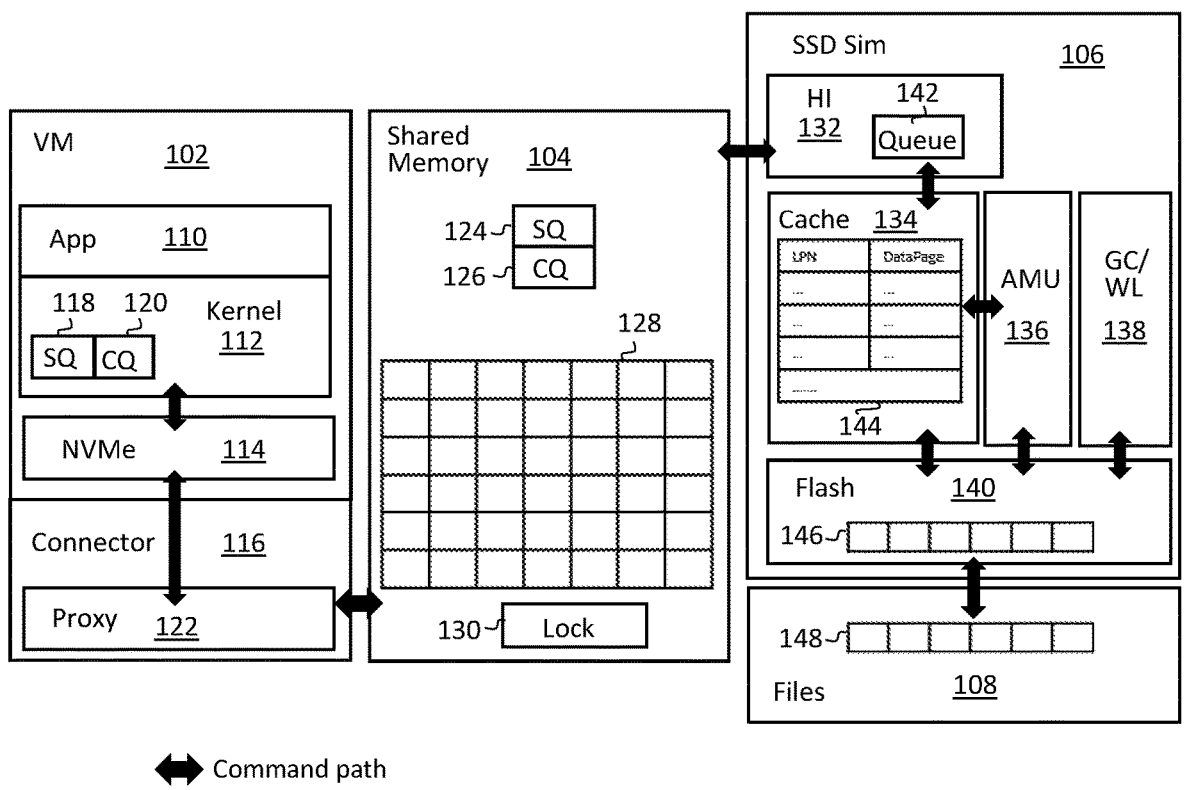
FIG. 1 is a diagram illustrating a system simulator of data storage and retrieval, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure; it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs, Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device, according to one embodiment, may be one of various types of electronic devices utilizing storage devices. For example, the electronic device can use any suitable storage standard such as, for example, nonvolatile memory express (NVMe), NVMe over fabrics (NVMeoF), and the like. The electronic devices may include, for example, a portable communication device (e.g., a smart phone), a computer, a portable multimedia device, a portable medical device, a camera, a wearable device, or a home appliance. However, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly e.g., wired), wirelessly, or via a third element.

As used herein, the term "module" may include a unit implemented in hardware, software, firmware, or combination thereof, and may interchangeably be used with other terms, for example, "unit," "logic." "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, and/or field programmable gate arrays (FPGAs).

SSD performance characteristics can be measured with a real world application requiring valid data retention. Multi-queue simulation (MQSim) simulates most SSD I/O paths, but may not be capable of data storage/retrieval or full system simulation.

During SSD simulation, written data is expected to be read back. While a few full system SSD simulators have data retention features, they relate only to system-level data retention without SSD component behavior models. It may be difficult to validate component behaviors without real data storage and retrieval models.

This disclosure provides systems and methods in which actual data may be passed throughout applications, a system, and an SSD simulator. Data may be stored in a system memory and file systems, and large workloads may be supported through automatic tiering between the system memory and file systems. The simulation can be paused, with a current state stored in file systems, and then restarted from that state.

The disclosure enables performance simulation of real application workloads in full system SSD simulators, such as, for example, database (DB) and operating system (OS) boot. The disclosure increases behavior model accuracy such that it may be closer to real SSL) components, such as, for example, garbage collection, cache/buffer, flash transaction scheduling, and partial read/write.

Application-level simulation may require data-aware simulation. Data-aware simulation captures the system behavior depending on data in addition to the component architecture. Various embodiments herein describe a simulation method that can at least partially decouple component behavior from data, and implements data-dependent processes to realize performant functional simulation.

Specifically, this disclosure provides for component-level data storage and retrieval simulation, which allows for data transfer between SSD components using a shared memory. Data/metadata flash blocks simulation may also be provided using tiers of system memory and file systems using a list such as a least recently used (LRU) block list.

FIG. 1 is a diagram illustrating a system simulator of data storage and retrieval, according to an embodiment. The system includes a virtual machine (VM) 102, a shared memory (SM) 104, an SSD simulator 106, and a file system 108.

The virtual machine 102 may be implemented as an emulator that emulates a machine's processor through dynamic binary translation (e.g., translation of binary code from one instruction set architecture (ISA) to another ISA) and provides a set of different hardware and device models for the machine.

In system operation, an application 110 may be executed on the virtual machine 102, and data buffer pointers that are provided to a submission queue (SQ) 118 of an OS kernel 112 may be passed, via an NVMe device 114, to an I/O request proxy 122 of an SSD simulator connector 116. The data buffer pointers correspond to application data in the OS kernel 112. The I/O request proxy 122 copies the application data from the OS kernel 112 to data buffer pages 128 in the shared memory 104. Specifically, one or more pages of the shared memory 104 may be allocated for the copied allocation data, and additional pages of the shared memory 104 may be allocated to store an allocated page list. The data buffer pages 128 are described in greater detail below with reference to FIG. 2. The I/O request proxy 122 also passes the data buffer pointers to an SQ 124 of the shared memory 104. A completion queue (CQ) 120 may be updated upon completion of the operation.

The data buffer pointers may be provided from the SQ 124 of the shared memory 104 to a request queue 142 of a host interface (HI) 132 of the SSD simulator 106. A CQ 126 of the shared memory 104 may be updated upon completion of the operation. The HI 132 distributes pages to a data cache manager 134. The data cache manager 134 references the data buffer pages 128 of the shared memory 104, and stores the data buffer pointers and corresponding references to the data buffer pages 128 in the shared memory 104, to pages in a data cache 144. The data cache manager 134 evicts existing cached pages as necessary to store the newly received pages. The data cache manager 134 is described in greater detail below with reference to FIG. 3.

The data cache manager 134 provides a logical page address (LPA) of each page in the data cache 144 to an AMU 136, which manages mappings between LPAs and physical page addresses (PPAs). The AMU 136 is described in greater detail below with reference to FIG. 4. A garbage collection (GC)/wear leveling (WL) unit 138 reads/writes pages and erases blocks so that it can free up partially used blocks, Pages that are evicted from the data cache 134 may be distributed to flash memory chips 146 at a flash memory 140. The flash memory 140 stores page pointers and corresponding references to data buffer pages 128 in the shared memory 104. While this embodiment provides the AMU 136 and the GC/WL unit 138 as components, the disclosure is not limited thereto, and additional and/or alternative components may also be provided.

Accordingly, components of the SSD simulator may individually reference the data buffer pages 128 of the shared memory 104. Embodiments provide a framework to simulate data manipulative functions, such as, for example, encryption and compression, at any SSD component. Performance characteristics of components can be measured and validated with real applications, such as DBs. Validated data manipulated features may be developed and implemented in a real SSD device. Data efficiency and consistency of experimental data storage technologies may be validated.

Upon the data buffer pages 128 reaching a certain filled capacity (e.g., existing free pages are insufficient), data pages of the flash memory 140 may be flushed and stored to the file system 108 in the background. The flushed data pages may be dereferenced. The flash memory 140 and the file system 108 are described in greater detail below with reference to FIG. 6.

Figure 2:
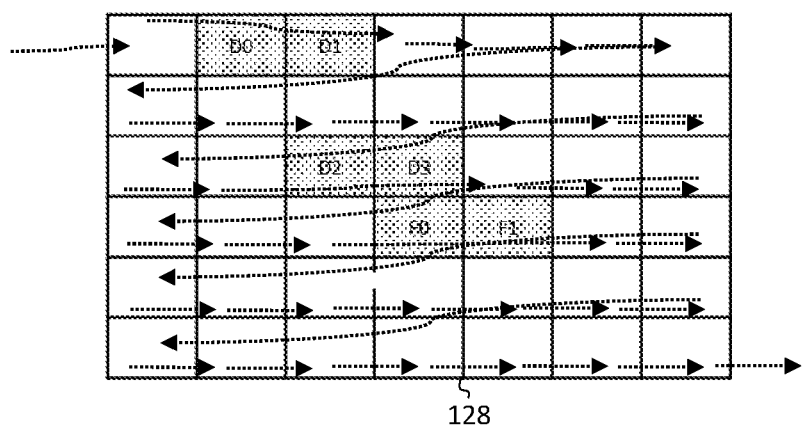
FIG. 2 is a diagram illustrating data buffer pages of a shared memory for SSD simulation, according to an embodiment.
Figure 2:
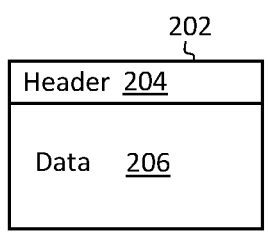

FIG. 2 is a diagram illustrating the data buffer pages of the shared memory for SSD simulation, according to an embodiment. The data buffer pages 128 of the shared memory 104 may be linked by next pointers indicating a sequence free data buffer pages. Pages may be allocated for data storage from a free page list. Both the virtual machine 102 and the SSD simulator 106 can allocate data to or free data from the data buffer pages 128. A data page lock 130 of the shared memory 104 may be utilized to synchronize data of the virtual machine 102 and the SSD simulator 106. As shown in FIG. 2, data has been allocated to shaded data buffer pages D0, D1, D2, D3, F0, and F1, and the arrows indicate the sequence of free data buffer pages indicated by the next pointers.

An individual page 202 of the data buffer pages 128 includes a page header 204 and a data portion 206. The page header 204 includes a respective next pointer or reference count. Specifically, the next pointer field may be reused as a reference count field. For example, the next pointer may be stored in the free page list to indicate that the page is free for allocation, and the reference count may be stored after the allocation. A size of the page 202 may be the same as that of a page stored to the flash memory chips 146 in the flash memory 140.

Figure 3:
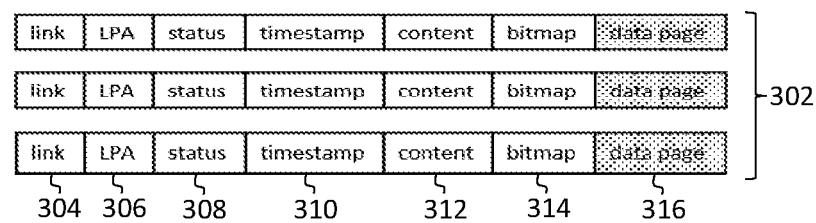
FIG. 3 is a diagram illustrating a data cache manager of an SSD simulator for SSD simulation, according to an embodiment.

FIG. 3 is a diagram illustrating the data cache of the SSD simulator for SSD simulation, according to an embodiment. Each of the pages 302 in the data cache 144 includes an LIEU link field 304, an LPA field 306, a status field 308, a timestamp field 310, a content field 312, a bitmap field 314, and a data page field 316. The data page field 316 includes a reference to application data from the data buffer pages 128 of the shared memory. The data cache manager 134 evicts existing cached pages as necessary to store pages newly received from the HI 132. When a cached page is evicted, it may be written to the flash memory chips 146 of the flash memory 140. Each page in the data cache 144 may be referenced as a slot.

Figure 4:
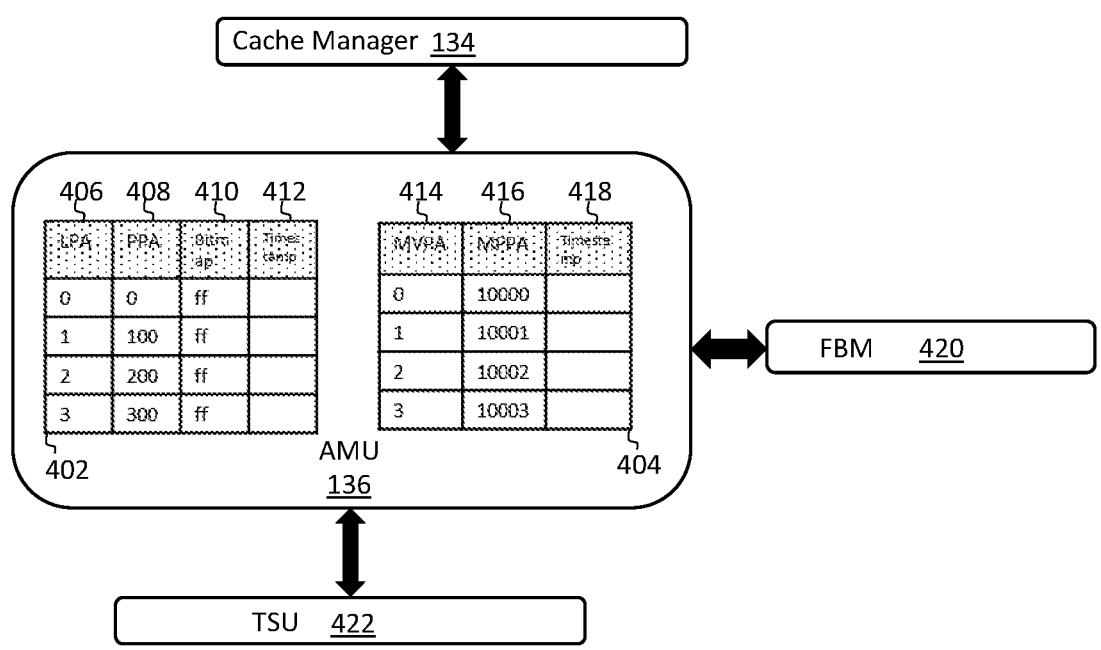
FIG. 4 is a diagram illustrating an address mapping unit (AMU) of an SSD simulator for SSD simulation, according to an embodiment.

FIG. 4 is a diagram illustrating the AMU of the SSD simulator for SSD simulation, according to an embodiment. Specifically, the AMU 136 of the SSD simulator 106 includes a global mapping table (GMT) 402 and a global table directory (GTD) 404, The GMT 402 maps LPAs to PPAs. Specifically, the GMT 402 includes an LPA field 406, a PPA field 408, a bitmap field 410, and a timestamp field 412. The GTD 404 is a page allocation table for the GMT 402. The GTD 404 maps mapping virtual page addresses (MVPAs) to mapping physical page addresses (MPPAs). Specifically, the GTD 404 includes an MVPA field 414, an MPPA field 416, and a timestamp field 418.

The AMU 136 may be in communication with the data cache manager 134, a flash block manager (FBM) 420, and a transaction scheduling unit (TSU) 422 of the flash memory 140. An LPA may be provided from the data cache manager 134 to the AMU 136 and used in the GMT 402. A block allocation request and resulting block allocations may be provided between the AMU 136 and the FBM 420. Transactions of the GMT 402 and the Gil) 404 may be provided from the AMU 136 to the TSU 422 for mapping table and mapping page allocation table storage at the flash memory 140. The mapping table and mapping page allocation table may be encoded to flash pages and persisted by writing pages to the flash memory 140.

Figure 5:
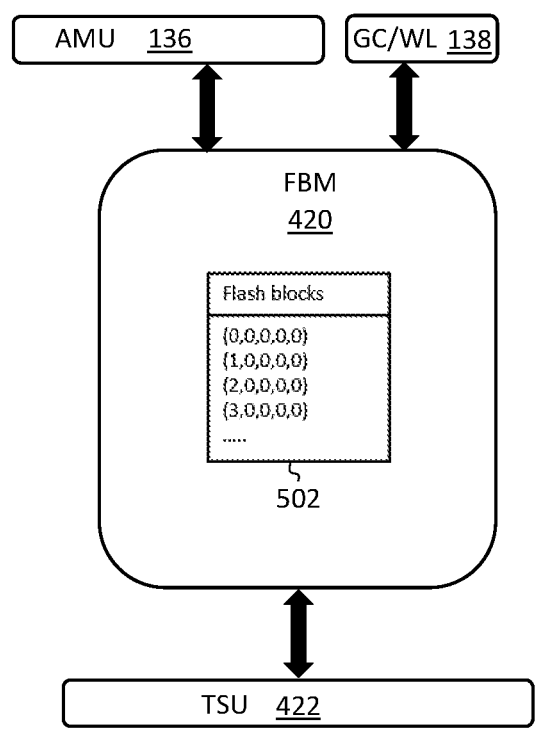
FIG. 5 is a diagram illustrating a flash block manager of an SSD simulator for SSD simulation, according to an embodiment.

FIG. 5 is a diagram illustrating the flash block manager of the SSD simulator for SSD simulation, according to an embodiment. The FBM 420 is another component of the SSD simulator 106. The FBM 420 manages flash blocks 502, and allocates free flash blocks of the flash memory 140 to other components of the SSD simulator 106. Each flash block may be defined by a channel field, a chip field, a die field, a plane field, and a block field. As described with respect to FIG. 4, the FBM 420 may be in communication with the AMU 136 for flash block allocation request and resulting flash block allocation. Similarly, the FBM 420 may also be in communication with the GC/WL 138 for flash block allocation request and resulting flash block allocation. The FBM 420 may also be in communication with the TSU 422 of the flash memory 140 to persist the list of free flash blocks. Free flash blocks may be encoded to flash pages and persisted by writing the pages to the flash memory.

Figure 6:
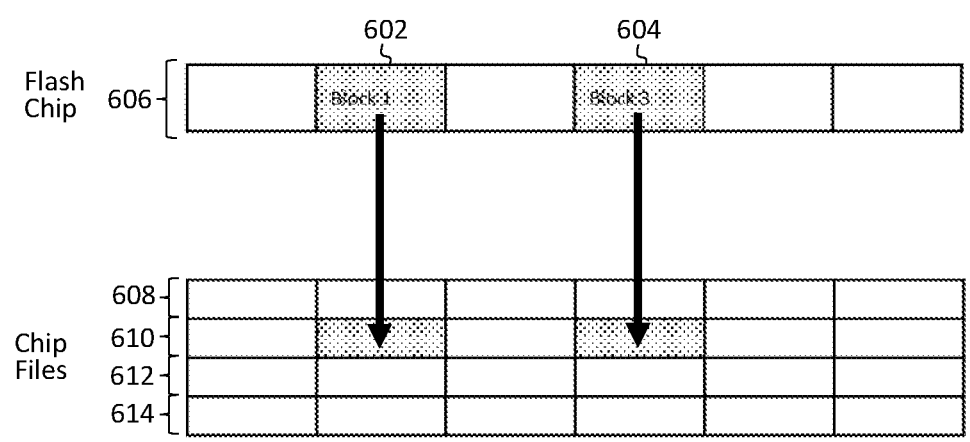
FIG. 6 is a diagram illustrating flash block persistence at the SSD simulator during SSD simulation, according to an embodiment.

FIG. 6 is a diagram illustrating flash block persistence at the SSL) simulator during SSD simulation, according to an embodiment. At the flash memory 140 of the SSD simulator 106, LRU-linked blocks of a chip-1 606 (e.g., block-1 602 and block-3 604) may be written to corresponding files of the file system 108, when, for example, data pages of the shared memory are 90% full. The file system 108 includes chip-0 file 608, chip-1 file 610, chip-2 file 612, and chip-3 file 614, for corresponding flash memory chips of the flash memory 140. The file system 108 may be a temporary file system (tmpfs)/RAM file system (ramfs), A regular file system may be used for persistent data storage.

FIG. 7 is a diagram illustrating flash memory chip files of the flash memory, according to an embodiment. Each flash memory chip 146 of the flash memory 140 may include two types of backing files, a data file 702 and a metadata file 704. The file format of each file includes a die field, a plane field, a block field, and a page field. The data file 702 contains data in page units. A file name of the data file 702 may be derived from chip ID: Device.X.ChanneLy.Chip.Z.data. Assuming sizes are aligned, there may be direct I/O between the data file 702 and the data buffer page 202 of the shared memory 104. The metadata file 704 contains page metadata. A file name of the metadata file 704 may be derived from chip ID: Device.X.Channel.Y.Chip.Z.meta.

Figure 8:
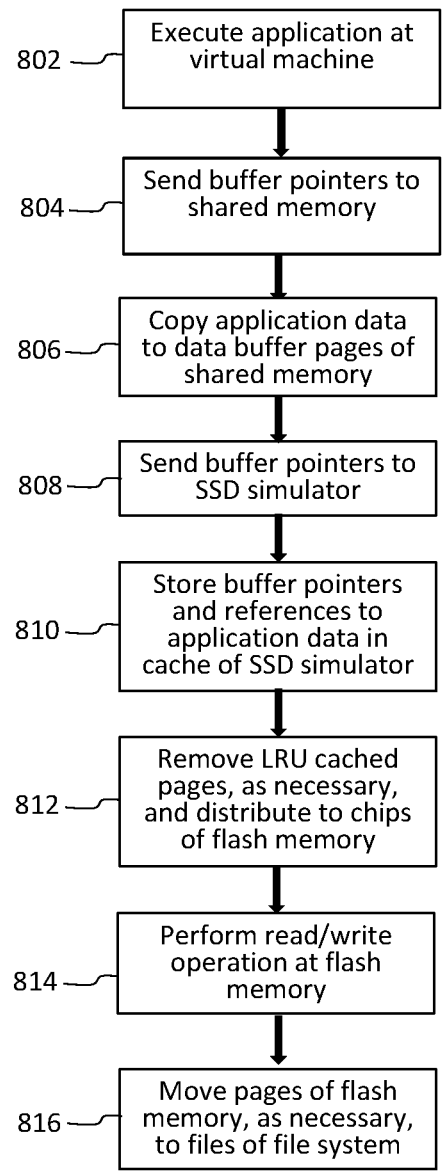
FIG. 8 is a flowchart illustrating a method for SSD simulation, according to an embodiment.

FIG. 8 is a flow chart illustrating a method for SSD simulation, according to an embodiment. Any components or combination of components described herein can be used to perform one or more of the operations of the flow chart. The operations are exemplary and may involve various additional steps not explicitly described, Embodiments are not limited to the described order of operations, and the order of operations may vary.

At 802, an application may be executed at a virtual machine. At 804, buffer pointers for application data of the executed application may be sent from the virtual machine to a shared memory. At 806, the application data may be copied from the virtual machine to data buffer pages of the shared memory. At 808, the buffer pointers may be sent from the shared memory to an SSD simulator. At 810, the buffer pointers and corresponding references to the application data at the shared memory may be stored in pages of a cache of the SSD simulator.

At 812, LRU cached pages may be removed to a flash memory of the SSD simulator, as necessary, to store the buffer pointers and the corresponding references in the pages of the cache. The removed pages may be distributed to flash memory chips of the flash memory. At 814, read and/or write operations may be performed at the flash memory. For example, in a read (or retrieve) operation, buffer pointers of an application may be filled with existing buffer pointers in the flash memory. In a write (or store) operation, buffer pointers sent by an application may be stored in the flash memory for reference.

At 816, existing pages of the flash memory may be moved to a file system, as necessary, to distribute the LRU cached pages to the flash memory chips of the flash memory. The moved existing pages may be stored to files of the file system. The file system comprises a file for each flash memory chip of the flash memory.

Figure 9:
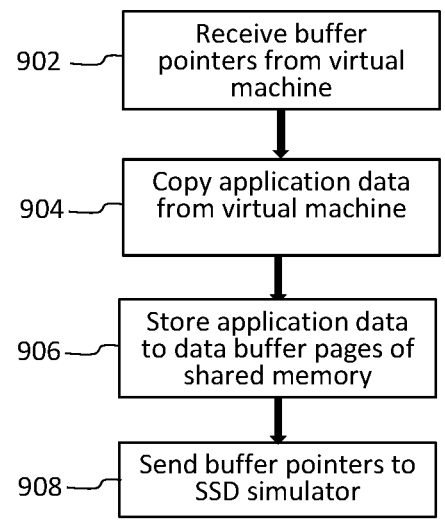
FIG. 9 is flowchart illustrating a method of SSD simulation at a shared memory, according to an embodiment.

FIG. 9 is a flowchart illustrating a method of SSD simulation at a shared memory, according to an embodiment. Any components or combination of components described herein can be used to perform one or more of the operations of the flow chart. The operations are exemplary and may involve various additional steps not explicitly described. Embodiments are not limited to the described order of operations, and the order of operations may vary.

At 902, buffer pointers for application data of an application executed on a virtual machine, may be received from the virtual machine. At 904, application data may be copied from the virtual machine. At 906, the application data may be stored to data buffer pages of the shared memory. The data buffer pages may be allocated from a free page list for the application data. The free page list includes an ordered list of next pointer fields from headers of the data buffer pages. Reference counts of the data buffer pages may be stored after allocation. The next pointer fields of the headers may be reused as the reference counts. At 908, the buffer pointers may be sent to the SSD simulator. The SSD simulator references the application data stored at the shared memory using the buffer pointers.

Figure 10:
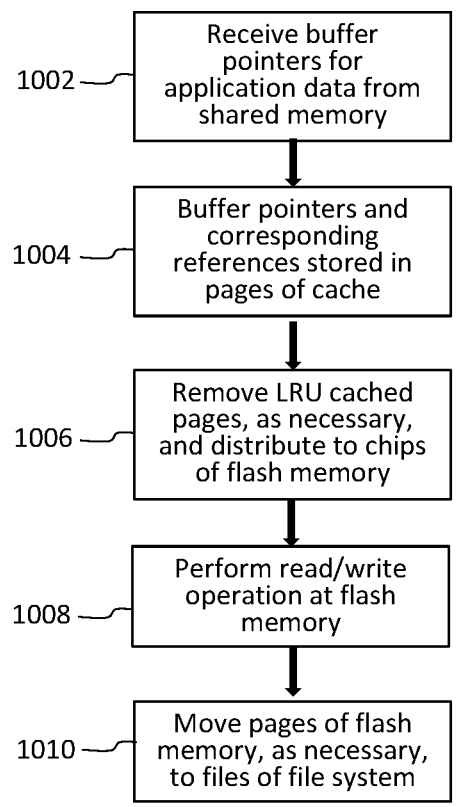
FIG. 10 is a flowchart illustrating a method of SSD simulation at an SSD simulator, according to an embodiment.

FIG. 10 is a flowchart illustrating a method of SSD simulation at an SSD simulator, according to an embodiment. Any components or combination of components described herein can be used to perform one or more of the operations of the flow chart. The operations are exemplary and may involve various additional steps not explicitly described. Embodiments are not limited to the described order of operations, and the order of operations may vary.

At 1002, buffer pointers for application data of an application executed on a virtual machine, may be received from a shared memory. At 1004, the buffer pointers and corresponding references to application data stored at the shared memory may be stored in pages of a cache of the SSD simulator.

As also described above with reference to FIG. 8, at 1006, LRU cached pages may be removed to a flash backed of the SSD simulator, as necessary, to store the buffer pointers and the corresponding references in the pages of the cache. The removed pages may be distributed to flash memory chips of the flash memory, At 1008, read and/or write operations may be performed at the flash memory. For example, in a read (or retrieve) operation, buffer pointers of an application may be filled with existing buffer pointers in the flash memory. In a write (or store) operation, buffer pointers sent by an application may be stored in the flash memory for reference.

At 1010, existing pages of the flash memory may be moved to a file system, as necessary, to distribute the LRU cached pages to the flash memory chips of the flash memory. The moved existing pages may be stored to files of the file system. The file system includes a file for each flash memory chip of the flash memory.

An embodiment may be implemented as software including one or more instructions that are stored in a storage medium that is readable by a machine. For example, a processor of an electronic device may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described embodiments may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 11:
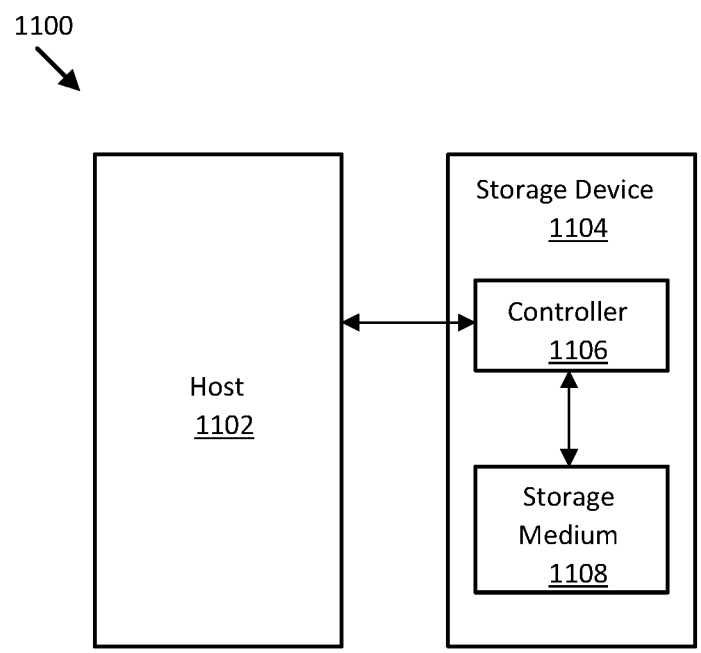
FIG. 11 illustrates a diagram of a storage system, according to an embodiment.

FIG. 11 illustrates a diagram of a storage system 1100, according to an embodiment. The storage system 1100 includes a host 1102 and a storage device 1104. Although one host and one storage device is depicted, the storage system 1100 may include multiple hosts and/or multiple storage devices. The storage device 1104 may be a SSD, a universal flash storage (UFS), etc. The storage device 1104 includes a controller 1106 and a storage medium 1108 connected to the controller 1106. The controller 1106 may be an SSD controller, a UFS controller, etc. The storage medium 1108 may include a volatile memory, a non-volatile memory; or both, and may include one or more flash memory chips (or other storage media). The controller 1106 may include one or more processors, one or more error correction circuits, one or more FPGAs, one or more host interfaces, one or more flash bus interfaces, etc., or a combination thereof. The controller 1106 may be configured to facilitate transfer of data/commands between the host 1102 and the storage medium 1108. The host 1102 sends data/commands to the storage device 1104 to be received by the controller 1106 and processed in conjunction with the storage medium 1108. As described herein, the methods, processes and algorithms may be implemented on a storage device controller, such as controller 1106. Arbiters, command fetchers, and command processors may be implemented in the controller 1106 of the storage device 1104, and processors and buffers may be implemented in the host 1102.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for solid state device (SSD) simulation, comprising:
executing an application at a virtual machine;
sending buffer pointers for application data of the executed application, from the virtual machine, to a shared memory;
copying the application data from the virtual machine to data buffer pages of the shared memory;
sending the buffer pointers, from the shared memory, to an SSD simulator; and
storing the buffer pointers and corresponding references to the application data at the shared memory, in pages of a cache of the SSD simulator.

2. The method of claim 1, wherein storing the buffer pointers and the corresponding references in the pages of the cache comprises:
removing least recently used (LRU) cached pages to a flash memory of the SSD simulator to store the buffer pointers and the corresponding references in the pages of the cache;
distributing the LRU cached pages to flash memory chips of the flash memory; and
performing at least one of a read operation and a write operation using the flash memory chips of the flash memory.

3. The method of claim 2, wherein distributing the LRU cached pages to the flash memory chips of the flash memory comprises:
moving existing pages of the flash memory to a file system to distribute the LRU cached pages to the flash memory chips of the flash memory; and
storing the moved existing pages to files of the file system, wherein the file system comprises a file for a flash memory chip of the flash memory.

4. The method of claim 1, further comprising:
storing a global mapping table and a global table directory in an address mapping unit of the SSD simulator,
wherein the global mapping table maps logical page addresses (LPAs) to a physical page addresses (PPAs), and wherein the global table directory maps mapping virtual page addresses (MVPAs) to mapping physical page addresses (MPPAs).

5. A method of solid state device (SSD) simulation at a shared memory, comprising:
receiving, from a virtual machine, buffer pointers for application data of an application executed on the virtual machine;
copying the application data from the virtual machine;
storing the application data to data buffer pages of the shared memory; and
sending the buffer pointers to an SSD simulator,
wherein the SSD simulator references the application data stored at the shared memory using the buffer pointers.

6. The method of claim 5, wherein storing the application data comprises:
allocating the data buffer pages from a free page list for the application data, wherein the free page list comprises an ordered list of next pointer fields from headers of the data buffer pages.

7. The method of claim 6, wherein storing the application data comprises:
storing reference counts of the data buffer pages after allocation, wherein the next pointer fields of the headers are reused as the reference counts.

8. A method of solid state device (SSD) simulation at an SSI) simulator, comprising:
receiving, from a shared memory, buffer pointers for application data of an application executed on a virtual machine; and
storing, in pages of a cache of the SSD simulator, the buffer pointers and corresponding references to the application data stored at the shared memory.

9. The method of claim 8, wherein storing the buffer pointers and the corresponding references in the pages of the cache comprises:
removing least recently used (LRU) cached pages to a flash memory of the SSD simulator to store the buffer pointers and the corresponding references in the pages of the cache;
distributing the LRU cached pages to flash memory chips of the flash memory;
performing at least one of a read operation and a write operation using the flash memory chips of the flash memory;
moving existing pages of the flash memory to a file system to distribute the LRU cached pages to the flash memory chips of the flash memory; and
storing the moved existing pages to files of the file system, wherein the file system comprises a file for a flash memory chip of the flash memory.

10. The method of claim 8, further comprising:
storing a global mapping table and a global table directory in an address mapping unit of the SSD simulator,
wherein the global mapping table maps logical page addresses (LPAs) to physical page addresses (PPAs), and
wherein the global table directory maps mapping virtual page addresses (MVPAs) to mapping physical page addresses (MPPAs).

11. A system for solid state device (SSD) simulation, comprising:
a virtual machine configured to execute an application, send buffer pointers for application data of the executed application to a shared memory, and copy the application data to data buffer pages of the shared memory;
the shared memory configured to store the application data to the data buffer pages, and send the buffer pointers to an SSD simulator; and
the SSD simulator configured to store the buffer pointers and corresponding references to the application data stored at the shared memory, in pages of a cache of the SSD simulator.

12. The system of claim 11, wherein the SSD simulator is further configured to:
remove least recently used (LRU) cached pages to a flash memory of the SSD simulator to store the buffer pointers and the corresponding references in the pages of the cache;
distribute the LRU cached pages to flash memory chips of the flash memory; and
perform at least one of a read operation and a write operation using the flash memory chips of the flash memory.

13. The system of claim 12, wherein the SSD simulator is further configured to:
move existing pages of the flash memory to a file system to distribute the LRU cached pages to the flash memory chips of the flash memory; and
store the existing pages to files of the file system, wherein the file system comprises a file for a flash memory chip of the flash memory.

14. The system of claim 11, wherein the SSD simulator is further configured to:
store a global mapping table and a global table directory in an address mapping unit of the SSD simulator,
wherein the global mapping table maps logical page addresses (LPAs) to physical page addresses (PPAs), and
wherein the global table directory maps mapping virtual page addresses (MVPAs) to mapping physical page addresses (MPPAs).

15. A memory device, comprising:
data buffer pages; and
a controller configured to:
receive, from a virtual machine, buffer pointers for application data of an application executed on the virtual machine;
copy the application data from the virtual machine;
store the application data to the data buffer pages; and
send the buffer pointers to an SSD simulator,
wherein the SSD simulator references the application data stored at the shared memory using the buffer pointers.

16. The memory device of claim 15, wherein, in storing the application data, the controller is further configured to:
allocate the data buffer pages from a free page list for the application data, wherein the free page list comprises an ordered list of next pointer fields from headers of the data buffer pages.

17. The memory device of claim 16, wherein, in storing the application data, the controller is further configured to:
store reference counts of the data buffer pages after allocation, wherein the next pointer fields of the headers are reused as the reference counts.

18. A solid state device (SSD) simulator, comprising:
a cache; and
a controller configured to:
receive, from a shared memory, buffer pointers for application data of an application executed on a virtual machine; and store, in pages of the cache of the SSD simulator, the buffer pointers and corresponding references to the application data stored at the shared memory.

19. The SSD simulator of claim 18, wherein, in storing the buffer pointers and the corresponding references in the pages of the cache, the controller is further configured to:
   remove least recently used (LRU) cached pages to a flash memory of the SSD simulator to store the buffer pointers and the corresponding references in the pages of the cache;
   distribute the LRU cached pages to flash memory chips of the flash memory;
   perform at least one of a read operation and a write operation using the flash memory chips of the flash memory;
   move existing pages of the flash memory to a file system to distribute the LRU cached pages to the flash memory chips of the flash memory; and
   store the existing pages to files of the file system, wherein the file system comprises a file for a flash memory chip of the flash memory.

20. The SSD simulator of claim 18, wherein the controller is further configured to:
   store a global mapping table and a global table directory in an address mapping unit of the SSD simulator,
   wherein the global mapping table maps logical page addresses (LPAs) to physical page addresses (PPAs), and
   wherein the global table directory maps mapping virtual page addresses (MVPAs) to mapping physical page addresses (MPPAs).

\* \* \* \* \*